(12) United States Patent
Wright

(10) Patent No.: US 7,160,394 B2
(45) Date of Patent: Jan. 9, 2007

(54) SUGAR JUICE CLARIFIER APPARATUS

(76) Inventor: Richard Wilfred Wright, 10848 Hillmont Ave., Baton Rouge, LA (US) 70810

( * ) Notice: Subject to any disclaimer, the term of this patent is extended or adjusted under 35 U.S.C. 154(b) by 299 days.

(21) Appl. No.: 10/658,145

(22) Filed: Sep. 9, 2003

(65) Prior Publication Data

US 2004/0255933 A1    Dec. 23, 2004

(51) Int. Cl.
*C13D 1/12* (2006.01)
(52) U.S. Cl. ................... 127/2; 127/7; 127/13; 127/14; 127/24; 127/27; 127/40; 127/46.1; 210/513; 210/523
(58) Field of Classification Search ..................... 127/2, 127/13, 14, 24, 27, 40, 46.1, 7; 210/513, 210/523
See application file for complete search history.

(56) References Cited

U.S. PATENT DOCUMENTS 2,641,363 A * 6/1953 Chatain ....................... 210/372

3,140,200 A * 7/1964 Rodriguez ................... 127/13

* cited by examiner

*Primary Examiner*—David A. Reifnsyder

(57) ABSTRACT

An apparatus for the continuous process of raw mixed sugar juice clarification by means of the settlement of insoluble particles and juice precipitate in a cylindrical clarifier tank that permits non-turbulent vertical subsidation and short retention time of the sugar juice in a relatively large, non-turbulent settling sector of the contents of the cylindrical clarifier tank which is maintained by the continuous rotary advancement of the raw mixed sugar juice entry and clear sugar juice and precipitate extraction station arm that rotates within and around the center of the annular shaped cylindrical clarifier tank. The rotating arm has three internal radial compartments which provide for the introduction of raw mixed sugar juice and the extraction of clear sugar juice and precipitate, in and out of the annular clarifier tank in the immediate vicinity of the respective leading and trailing faces of the rotating arm, through adjustable slots on the leading and trailing faces of the arm.

2 Claims, 6 Drawing Sheets

SECTIONAL VIEW ON X-X (FIG.1)

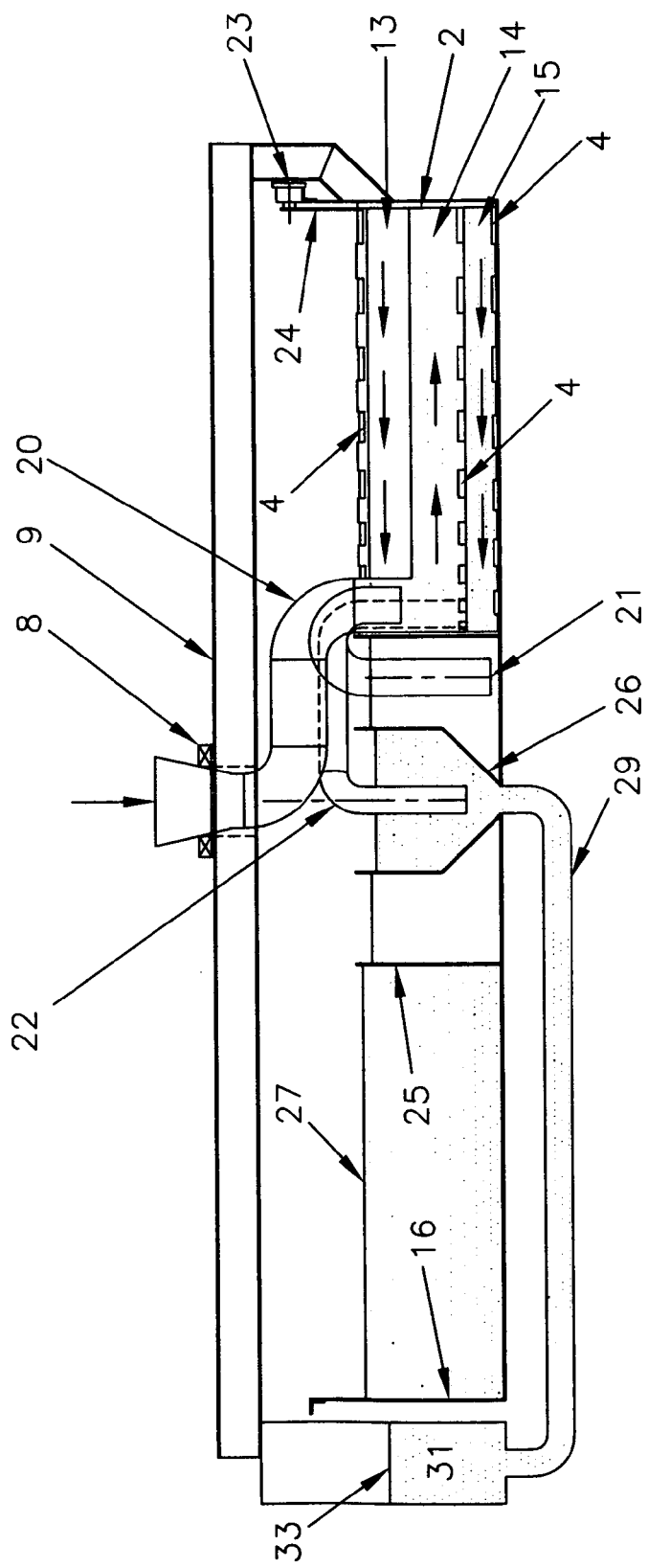
SECTIONAL VIEW ON X-X (FIG.4)
FIG.5

SUGAR JUICE CLARIFIER APPARATUS

BACKGROUND OF THE INVENTION

This invention relates to a raw mixed sugar juice clarification apparatus that allows precipitation, subsidation and separation of insoluble and mud particles in raw mixed sugar juice in a more efficient way than that which is presently practiced in the international sugar industry.

Physical and chemical clarification of raw mixed sugar juice is currently practiced in the sugar industry by the addition of lime and sometimes, additional substances that cause a precipitate to form within the raw mixed sugar juice. This precipitate, sometimes including a polyelectrolyte flocculant, entraps suspended impurities in the raw mixed sugar juice. Due to the difference in densities between the precipitate and the clear sugar juice; the precipitate sinks to the lower region of the conventional clarifiers used in the industry. The clear sugar juice, due to its lower density; rises to take-off points in the upper section of conventional clarifiers.

Whilst there are various clarifier designs currently being used in the industry; they all have a common operational disadvantage. This is that the raw mixed sugar juice requires even and gentle distribution into the clarifier body together with an equally even and gentle extraction of the clear sugar juice and precipitate in order to permit vertical rising of the clear sugar juice and vertical settlement of the precipitate in a turbulence-free environment.

This condition of turbulence-free vertical 'plug flow' is practically impossible to achieve with the current designs of fixed, multi-point inlet and outlet facilities for the incoming raw mixed sugar juice and outgoing clear sugar juice and precipitate. Pure 'plug flow' would necessitate an infinite number of inlet and outlet facilities spread over the entire cross section plan of the clarifier vessel. Conventional clarifiers consequently operate on a compromise between vertical plug-flow and horizontal flow, which is necessary in order to distribute and extract the juice and precipitate, into and out of the clarifier body. The turbulence caused by the interaction of vertical and horizontal flow patterns results in flow short-circuiting and semi-stagnant zones within the contents of the clarifier. Flow short-circuiting and semi-stagnant zones produce a variation in the residence time of the sugar juice in the clarifier. This turbulent condition also affects the gravitational rate of settlement of the precipitate thus requiring a larger volume for settlement than a volume free from turbulence. A larger volume clarifier results in a longer average retention time for sugar juice in the clarifier. Sugar juice degrades with time and a loss of sucrose through inversion takes place, therefore the shortest retention time of sugar juice in a clarifier is a distinct production advantage.

BRIEF SUMMARY OF THE INVENTION

An apparatus for the continuous process of raw mixed sugar juice clarification by means of the settlement of insoluble particles and juice precipitate in a cylindrical tank that permits non-turbulent vertical subsidation and short retention time of the sugar juice in a relatively large, non-turbulent settling sector of the contents of the cylindrical tank which is maintained by the continuous rotary advancement of the raw mixed sugar juice entry and clear sugar juice and precipitate extraction station arm that rotates within and around the center of the annular shaped cylindrical clarifier tank. The rotating arm has three internal radial compartments which provide for the introduction of raw mixed sugar juice and the extraction of clear sugar juice and precipitate, in and out of the annular clarifier tank in the immediate vicinity of the respective leading and trailing faces of the arm, through adjustable slots on the leading and trailing faces of the rotating arm.

BRIEF DESCRIPTION OF THE DRAWINGS

FIG. 5 illustrates a sectional view through the body, bridge and rotating arm of a typical sugar juice clarifying apparatus as shown in FIG. 4, sectioned along the centerline of the bridge and rotating arm.

DETAILED DESCRIPTION OF THE INVENTION

Figure 1:
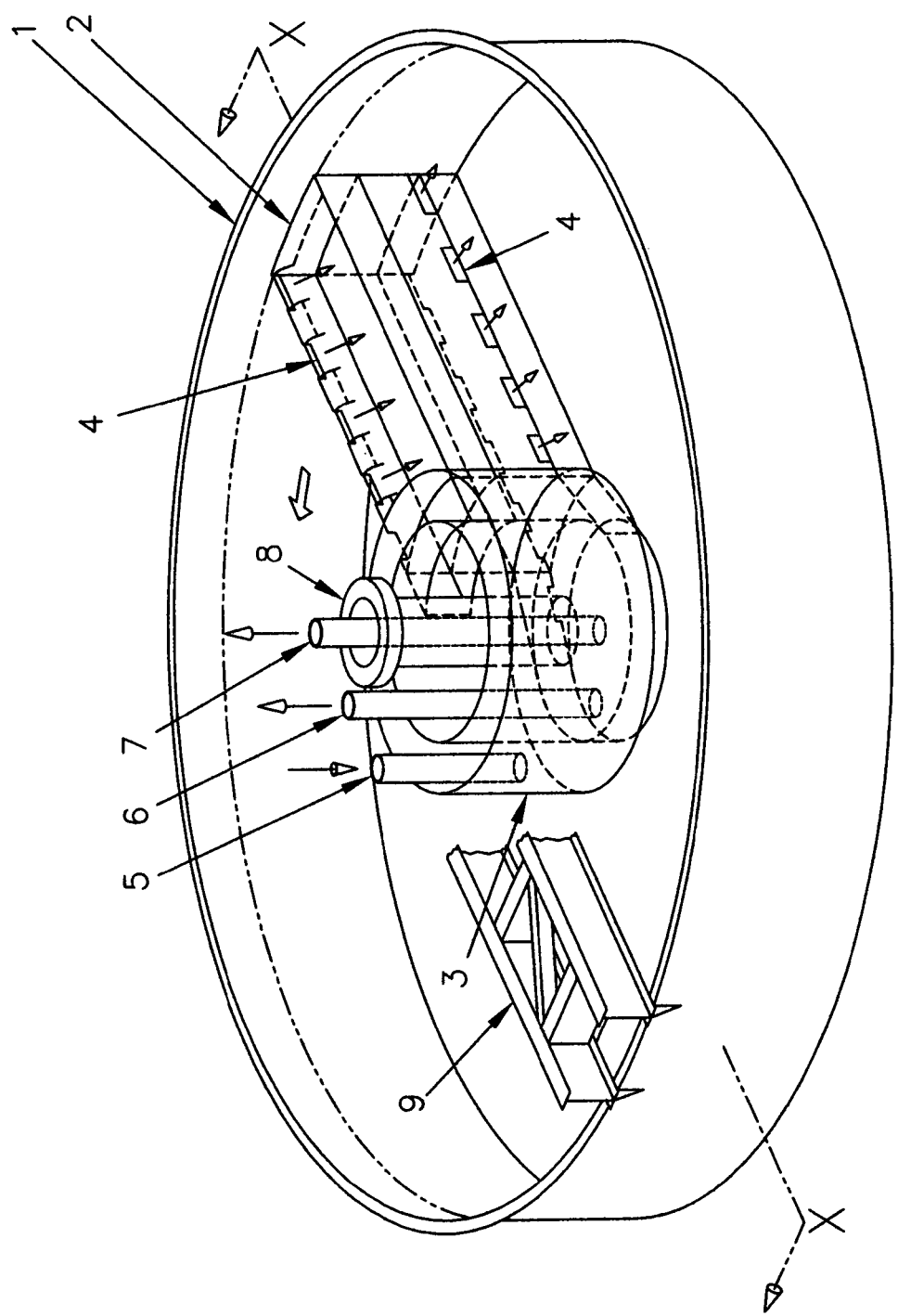
FIG. 1 illustrates an isometric view of a typical sugar juice clarifying apparatus in accordance with the first embodiment of the invention.

According to the invention, the vertical path of the settlement of the precipitate and the consequential vertical rise of the clear sugar juice in the shortest possible time is achieved by means of the maximum elimination of turbulence, cross currents and subsequent eddy currents within the volume of the raw mixed sugar juice contents of a cylindrical, annular clarification vessel. The reduction of the turbulence and cross currents in the annular volume of the clarifier tank is achieved by the elimination of raw mixed sugar juice introduction and precipitate and clear juice extraction in the major clarification sector of the annular volume of the clarifier tank, thus leaving the contents of this volume turbulent-free to achieve efficient separation through gravitational subsidence.

A rotating section consisting of an arm and hub that rotates around the center of the cylindrical shaped clarifier tank performs the introduction of the raw mixed sugar juice and the extraction of precipitate and clarified sugar juice. This rotating arm allows the liquid feed and discharge streams of the clarifier to rotate around the center of the clarifier tank thus leaving the majority of the contents of the clarifier tank undisturbed by any turbulence caused by these incoming and outgoing juice flows. The rotating arm section, where the incoming and outgoing juice flows occur, may include a baffle arrangement to control and direct the respective flows. In the first embodiment, the rotating arm is attached to a central rotating hub, which is centered in the clarifier tank and contains three concentric annular compartments, which provide the means of entry for the incoming raw mixed sugar juice and for the exit of clear sugar juice and precipitate through three vertical pines. The liquid levels in these three annular compartments dictate the respective rates of flow of the incoming raw mixed sugar juice and the outgoing clear sugar juice and precipitate. Adjustments to these levels will influence the respective flow rates thus also affecting the ratio of the split of the extraction of clear sugar juice and precipitate.

Extraction pumps with variable rates of pumping may be used to maintain the respective levels in the clear sugar juice and precipitate annular compartments in the central hub. A simple level control system may be incorporated in the clear sugar juice and precipitate compartments of the central hub such that the extraction pumps will remove the clear sugar juice and precipitate in a predetermined ratio, and at the same collective rate of the incoming mixed juice, thus ensuring hydraulic equilibrium of the flows in and out of the clarifier.

As a second embodiment, alternative to the use of variable flow pumps for the extraction of the clear sugar juice and precipitate in predetermined ratios, the extraction piping from the clear sugar juice and precipitate compartments of the rotating arm may be arranged in siphon configurations such that the extraction of clear sugar juice and precipitate from the respective compartments to non rotating tanks in the center of the clarifier tank, would be automatic. The rate of siphoned extraction of clear sugar juice and precipitate is dictated by the liquid level differential between the central concentric tanks and radial compartments on either side of the siphons. The two concentric, central and non rotating tanks are connected to a weir box on the periphery of the clarifier tank by means of two 'U' shaped pipe manifolds beneath the clarifier. The liquid levels in the central concentric non rotating tanks are controlled by adjustable height weir plates in the weir box. By raising or lowering each weir plate, the respective product outflow from the clarifier is decreased or increased by the liquid level differential.

The rotating arm section of the clarifier incorporates three radial compartments, an upper, a middle and a lower, each of which is fitted with adjustable slots to allow for the proportionate flows of all liquids coming into and going out of the clarifier tank and allows for the differential in flow rates between the inner and outer circumferential volumes of the cylindrical tank contents of the clarifier.

The lower radial compartment of the rotating arm which collects the precipitate may also be fitted with angled scraper blades that direct the settled precipitate towards the central hub, through the rotational movement of the arm on the base of the cylindrical clarifier tank bottom.

The lower trailing skirt edge of the lower radial compartment, where it moves over the base of the cylindrical clarifier tank body bottom, is fitted with a flexible wiper seal to contain the precipitate in this radial compartment. The rotating arm assembly, together with either its integral central hub of concentric annual compartments or as in the latter embodiment, with its mixed juice infeed pipe manifold; is pivoted in the center of the cylindrical clarifier tank body and is driven at a fixed rotational speed by means of either a central or peripheral drive. The rotational speed of the arm assembly in the clarifier will dictate the residence time of the juice in the clarifier.

The rotating arm assembly with either its central hub of concentric compartments, as in the first embodiment, or mixed sugar juice infeed manifold, as in the second embodiment; is supported and rotated from a fixed structural bridge which straddles across and over the diameter of the clarifier tank. This bridge also supports the rotating arm reduction speed drive system.

The turbulent-free liquid contents of the clarifier tank is maintained by the balanced extraction of clear sugar juice and precipitate on the leading edge of the rotating arm against the equivalent volume replacement of introduced raw mixed sugar juice off the trailing edge of the arm as it rotates around the center of the clarifier tank.

DETAILED DESCRIPTION OF THE PREFERRED EMBODIMENTS

Figure 2:
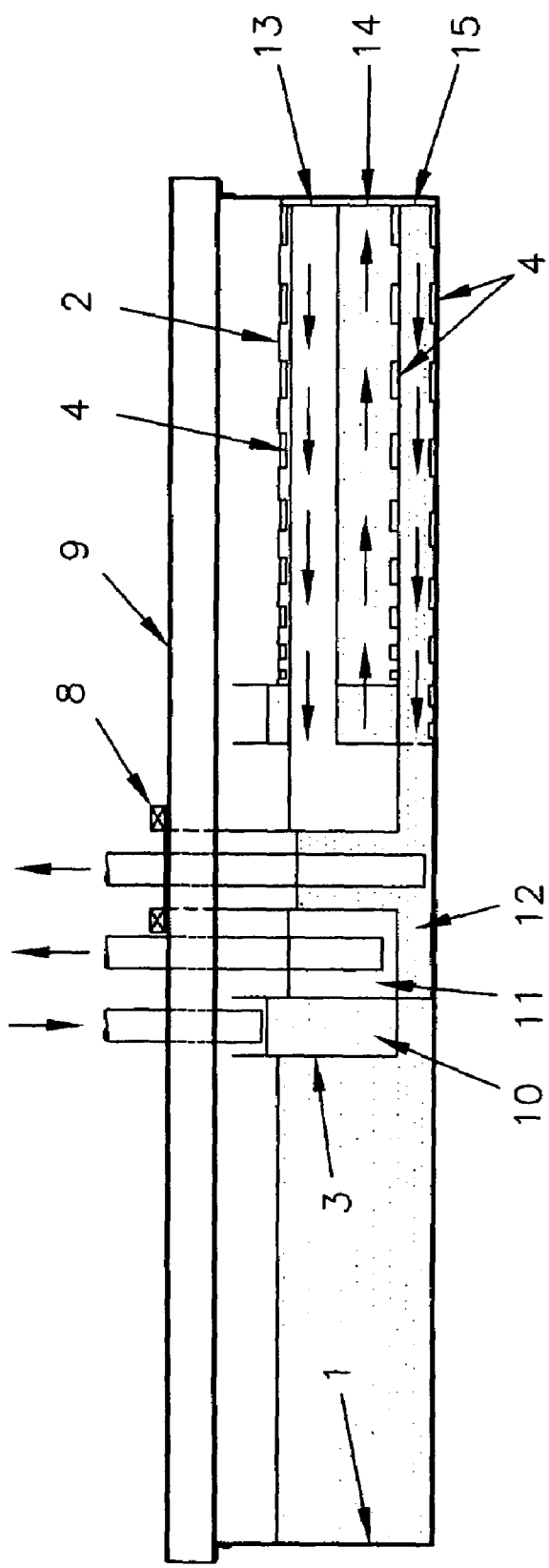
FIG. 2 illustrates a sectional view through the body, bridge and rotating arm of a typical sugar juice clarifying apparatus as shown in FIG. 1, sectioned along the centerline of the bridge and rotating arm.
Figure 3:
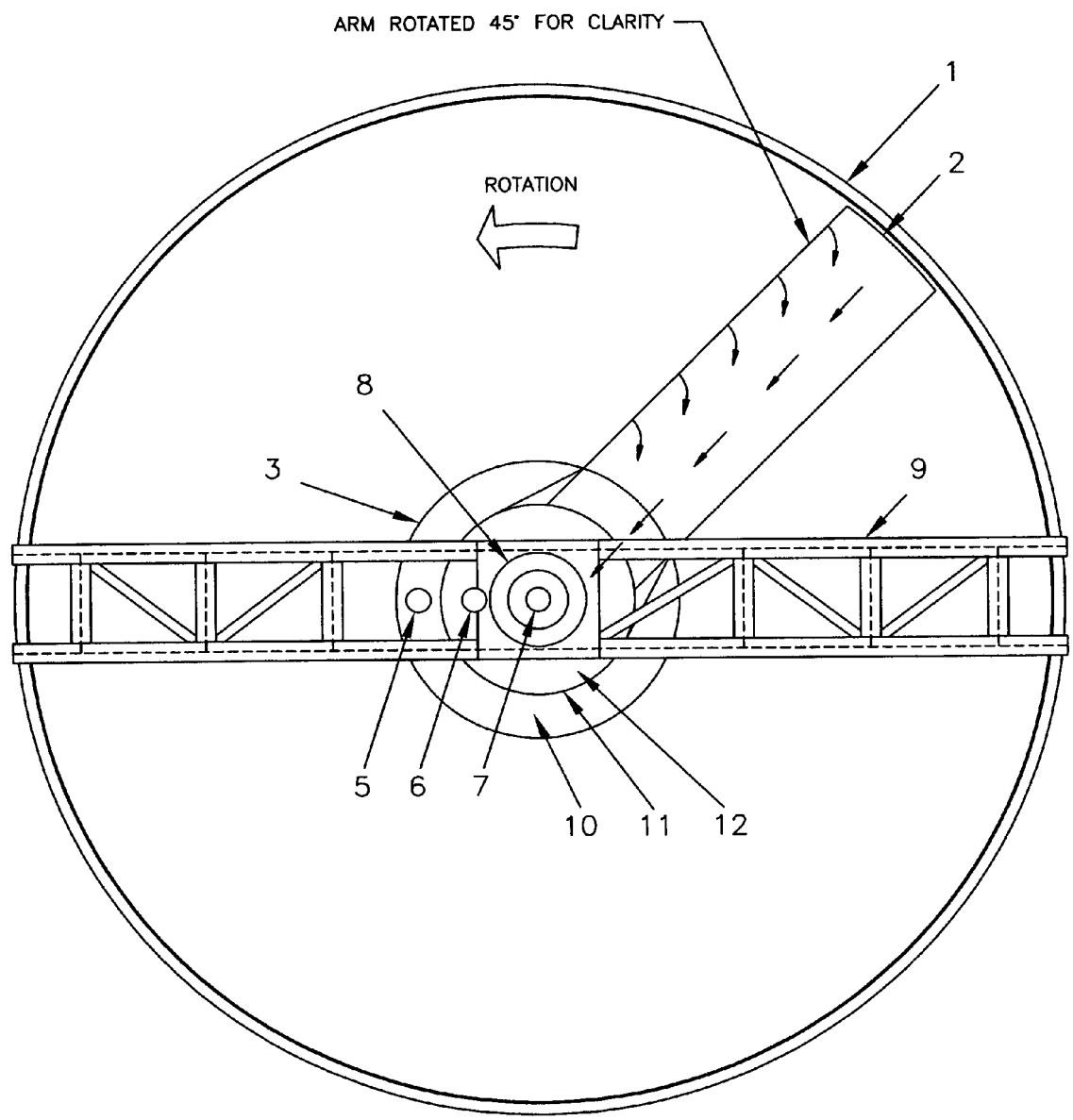
FIG. 3 illustrates a plan view of a typical sugar juice clarifying apparatus in accordance with the first embodiment of the invention.

With reference to the FIGS. 1, 2 & 3 drawings, the clarifying apparatus in accordance with the first embodiment of the invention consists of a body in the form of a cylindrical, open top, tank 1 which houses a rotating arm 2 that continuously rotates through the circular extent of the tank 1 and pivots on the center of the tank 1 through the central rotating hub 3 to which the arm 2 is fixed. The complete rotating assembly 2 & 3 is suspended from the center of the fixed bridge 9 by means of a slewing bearing assembly 8 and this form of support of the rotating assembly may also be augmented or substituted by an additional submerged bearing unit beneath the hub 3 and on the center of the bottom of the tank 1. For clarity, this additional bearing unit is not shown on the drawings.

The fixed bridge 9 is a structural member that spans the diameter of the tank 1 and is sufficiently stiffened to support the rotating assembly 2 & 3, the drive unit required to rotate the assembly and the three pipes 5, 6 & 7. The three pipes 5, 6 & 7 protrude into the three annular, concentric compartments 10, 11 & 12 of the rotating hub 3 to provide product flows into and out of the clarifier. The entry of raw mixed sugar juice into compartment 10 is through pipe 5 whilst the extraction of clear juice and precipitate out of compartments 11 and 12 is through pipes 6 and 7 respectively.

The incoming raw mixed sugar juice passes from the concentric compartment 10 through an orifice in the outer wall of the concentric compartment 10 into the middle radial compartment 14 of the rotating arm 2 which is fitted with adjustable slots 4 on its leeward side to allow even distribution of the mixed juice into the clarifier tank 1.

The separated clear sugar juice, which has risen to the top of the contents of the clarifier tank 1, immediately in front of the rotating arm 2, is extracted through the adjustable slots or cut outs 4 on the upper edge of the leading face of upper radial compartment 13 of the rotating arm 2.

The separated precipitate, which has subsided to bottom of the contents of the clarifier tank 1, immediately in front of the rotating arm 2, is extracted through the adjustable slots or cut outs 4 on the lower edge of the leading face of lower radial compartment 15 of the rotating arm 2. Angled scraper blades which may be incorporated in the lower radial compartment 15 to assist the mud flow towards the central hub concentric compartment 12 are not shown for the sake of clarity. The lower skirt edges of the sides and trailing edges of the lower radial compartment 15, where it moves over the base of the cylindrical clarifier tank bottom 1, is fitted with a flexible wiper seal to contain the precipitate in this radial compartment 15.

The separated clear sugar juice and precipitate travel along their respective radial compartments 13 and 15 in the rotating arm 2 towards their respective central concentric compartments 11 and 12 by means of liquid level differentials between the clarifier tank liquid level and the respective liquid levels in the central concentric compartments 11 and 12. These differentials may be maintained by variable speed extraction pumps or siphoning extraction piping with or without level control equipment, all of which is not shown in the drawings for sake of clarity.

The rotating arm 2 which is depicted as a three compartment, rectangular sectioned structure for ease of illustration;

may have a variety of cross sectional shapes of the three radial compartments 13, 14 & 15 to suit the increasing and decreasing capacity flows along the radial route of the respective content flows to and from the central hub 10, 11 & 12.

These variances to the cross sectional shape of the arm 2 may also include the leading and trailing faces of the arm 2 to allow for hydraulic flow gradients and/or streamlining in order to reduce the creation of turbulence through eddy currents on both the leading and trailing zones of the arm 2 as it rotates in the contents of the clarifier tank 1.

In order to conserve the heat of the sugar juice in the clarifier, the outside of tank 1 may be insulated and covered with a circular roof covering with suitable cut outs for ancillary equipment and inspection ports.

Figure 4:
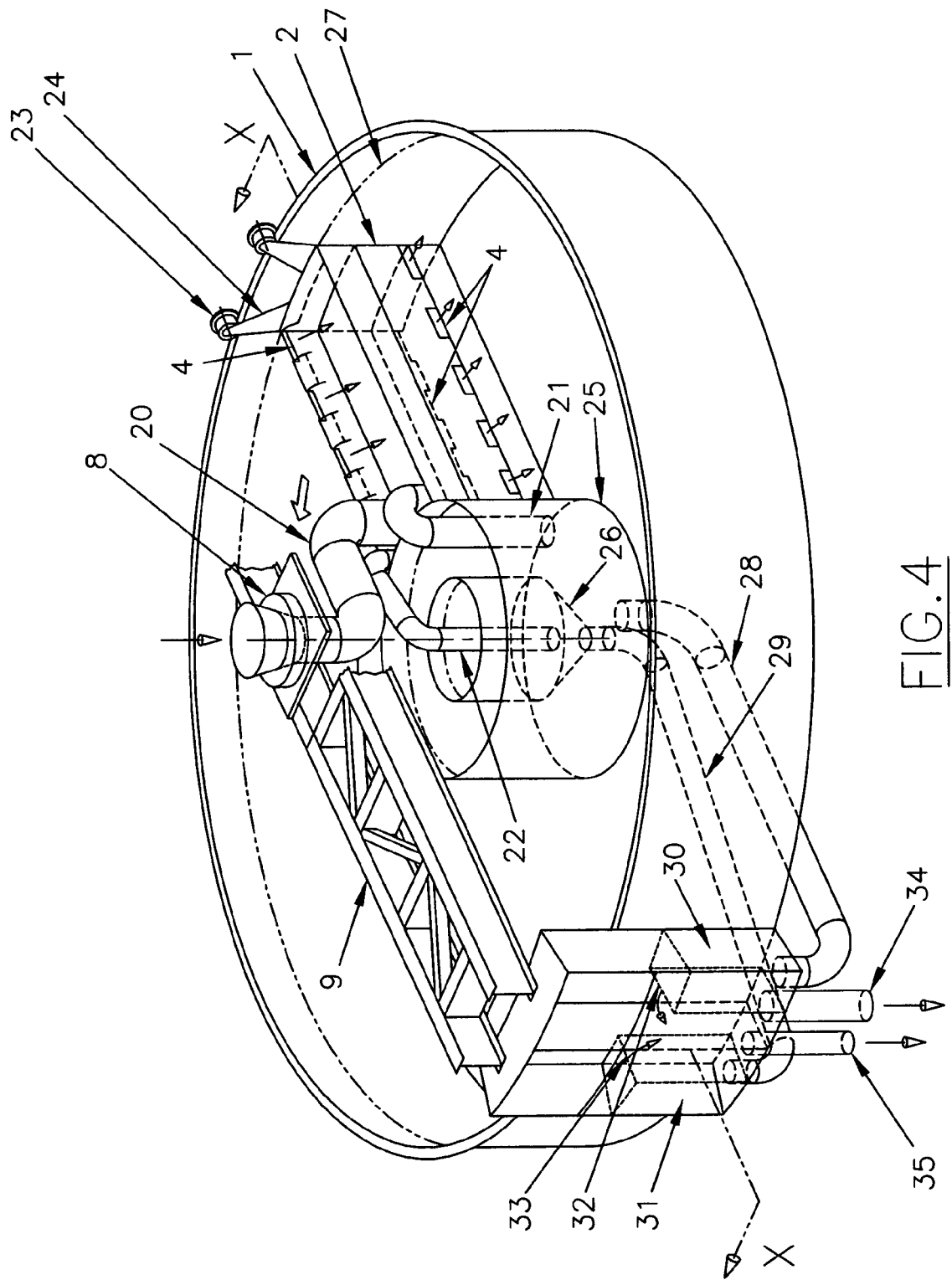
FIG. 4 illustrates an isometric view of a typical sugar juice clarifying apparatus in accordance with the second embodiment of the invention.
Figure 6:
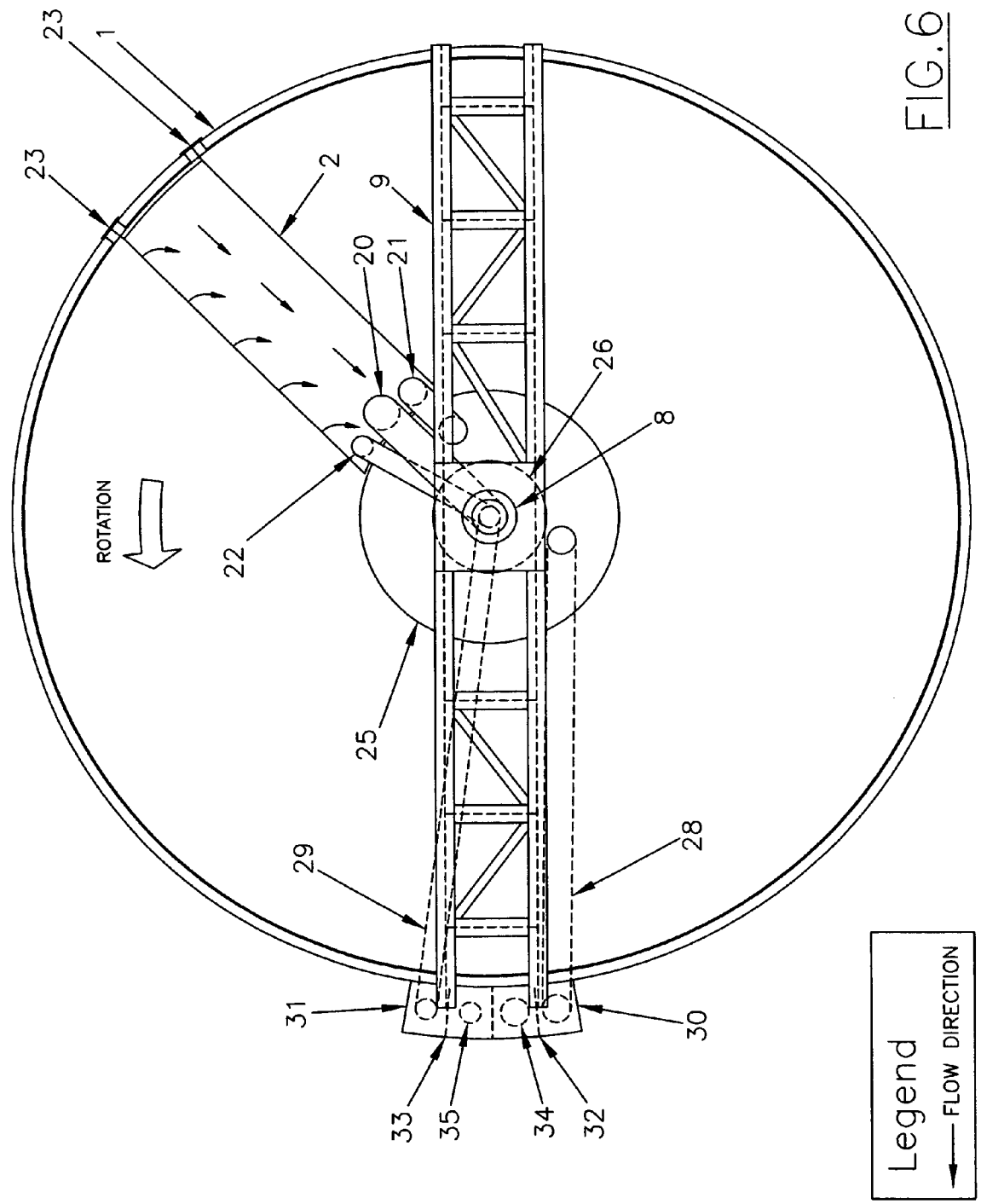
FIG. 6 illustrates a plan view of a typical sugar juice clarifying apparatus in accordance with the second embodiment of the invention.

With reference to the FIGS. 4, 5 & 6 drawings, the clarifying apparatus in accordance with the second embodiment of the invention consists of a body in the form of a cylindrical, open top, tank 1 which houses a rotating arm 2 that continuously rotates through the circular extent of the tank 1 and pivots off the central slewing bearing 8 located on the fixed bridge 9 on the centerline of the tank 1 through the central raw mixed sugar juice inlet pipe manifold 20 which is connected to the rotating arm 2.

The complete rotating assembly 2, 20, 21 & 22 is suspended from the center of the fixed bridge 9 by means of a slewing bearing assembly 8 and this form of support of the rotating arm assembly is also augmented by wheels 23 mounted on brackets 24 affixed to the outer corners of the rotating arm 2. These wheels 23 run on the stiffened top rim of the clarifier tank 1.

The fixed bridge 9 is a structural member that spans the diameter of the tank 1 and is sufficiently stiffened to support the rotating assembly 2, 20, 21, 22, 23 & 24 and the drive unit required to rotate the assembly 2, 20, 21, 22, 23 & 24.

The sides of the two central, non rotating, concentric tanks 25 & 26 protrude above the normal operating level 27 of the clarifier and the siphon transfer pipe manifolds 21 & 22 pass over the top edges of, and into these tanks 25 & 26. The inner precipitate tank 26 has a conical shaped bottom to facilitate the removal of the denser precipitate. Both tanks 25 & 26 discharge through two 'U' shaped manifolds 28 & 29 under the clarifier which connect to two weir boxes 30 & 31 which are fitted with vertically adjustable weirs 32 & 33. The clear sugar juice and precipitate outflows from the clarifier exit through pipes 34 & 35 attached to the bottom of the weir box.

The entry of raw mixed sugar juice into compartment 14 of the rotating arm 2 is through pipe manifold 20 whilst the extraction of clear sugar juice and precipitate out of compartments 13 and 15 is through siphon pipes 21 and 22 respectively.

The separated clear sugar juice, which has risen to the top of the contents of the clarifier 1, immediately in front of the rotating arm 2, is extracted through the adjustable slots or cut outs 4 on the upper edge of the leading face of the upper radial compartment 13 of the rotating arm 2.

The separated precipitate, which has subsided to the bottom of the contents of the clarifier tank 1, immediately in front of the rotating arm 2, is extracted through the adjustable slots or cut outs 4 on the lower edge of the leading face of the lower radial compartment 15 of the rotating arm 2. Angled scraper blades which may be incorporated in the lower compartment 15 to assist the precipitate flow towards the precipitate siphon pipe 22 are not shown for the sake of clarity. The lower skirt edges of the sides and trailing edges of the lower compartment 15, where it moves over the base of the cylindrical clarifier tank bottom 1, is fitted with a flexible wiper seal to contain the precipitate in this compartment 15.

The separated clear sugar juice and precipitate travel along their respective radial compartments 13 & 15 in the rotating arm 2 towards their respective central concentric compartments 25 and 26 through their respective siphon pipes 21 & 22 by means of liquid level differentials between the clarifier tank liquid level and the respective liquid levels in the central concentric compartments 25 and 26. These differentials will be maintained by adjusting the heights of the weir plates 32 & 33 in the weir boxes 30 & 31.

The rotating arm 2 which is depicted as a three radial compartment, rectangular sectioned structure for ease of illustration; may have a variety of cross sectional shapes of the three internal radial compartments 13, 14 & 15 to suit the increasing and decreasing capacity flows along the radial route of the respective content flows from the inlet manifold 20 to the siphon pipes 21 & 22.

These variances to the cross sectional shape of the arm 2 may also include the leading and trailing faces of the arm 2 to allow for hydraulic flow gradients and/or streamlining in order to reduce the creation of turbulence through eddy currents on both the leading and trailing zones of the arm 2 in the contents of the clarifier body 1.

In order to conserve the heat of the juice in the clarifier, the body 1 may be insulated and covered with a circular roof covering with suitable cut outs for ancillary equipment and inspection ports.

SUMMARY

In summary, the Applicant believes that the clarification apparatus in accordance with the invention provides a more efficient and less expensive sugar juice clarifier than currently available for the purpose of raw mixed sugar juice clarification through settlement of the precipitate in a turbulent-free hydraulic environment.

I claim:

1. A sugar juice clarification apparatus comprising:
   a cylindrical clarification tank having a center;
   an externally driven rotating arm and hub assembly comprising a central rotating hub attached to a rotating arm, the hub and arm assembly rotating about the center of the cylindrical clarification tank;
   the rotating arm comprising an upper compartment with a leading top edge, a middle compartment with a trailing vertical face, and a lower compartment with a leading bottom edge;
   the upper compartment having a series of adjustable slots on the leading top edge of the upper compartment;
   the middle compartment having a series of adjustable slots on the bottom portion of the trailing vertical face of the middle compartment;
   the lower compartment having a series of adjustable slots on the leading bottom edge of the lower compartment;
   the rotating hub comprising three concentric annular compartments, each connected to its relative compartment in the rotating arm by means of ducts;
   a means of removing the contents of the upper and lower compartments of the rotating arm assembly via the relative compartments of the central concentric smaller diameter tanks;

a means of introducing unclarified juice into the middle compartment of the rotating arm assembly via the respective concentric tank in the hub.

2. A sugar juice clarification apparatus comprising:

a cylindrical clarification tank having a center with centrally positioned, concentric smaller diameter tanks;

an externally driven rotating arm assembly rotating about the center of the cylindrical clarification tank, in the annular portion of the clarification tank between the outer circumference of the clarification tank and the outer circumference of the inner concentric smaller diameter tanks;

the rotating arm comprising an upper compartment with a leading top edge, a middle compartment with a trailing vertical face, and a lower compartment with a leading bottom edge;

the upper compartment having a series of adjustable slots on the leading top edge of the upper compartment;

the middle compartment having a series of adjustable slots on the bottom portion of the trailing vertical face of the middle compartment;

the lower compartment having a series of adjustable slots on the leading bottom edge of the lower compartment;

a means of siphoning the contents of the upper and lower compartments of the rotating arm assembly into the relative compartments of the central concentric smaller diameter tanks;

a means of introducing unclarified juice into the middle compartment of the rotating arm assembly through a pipe manifold through the centrally positioned support bearing for the pivotal support of the rotating arm assembly.

* * * * *